United States Patent Office.

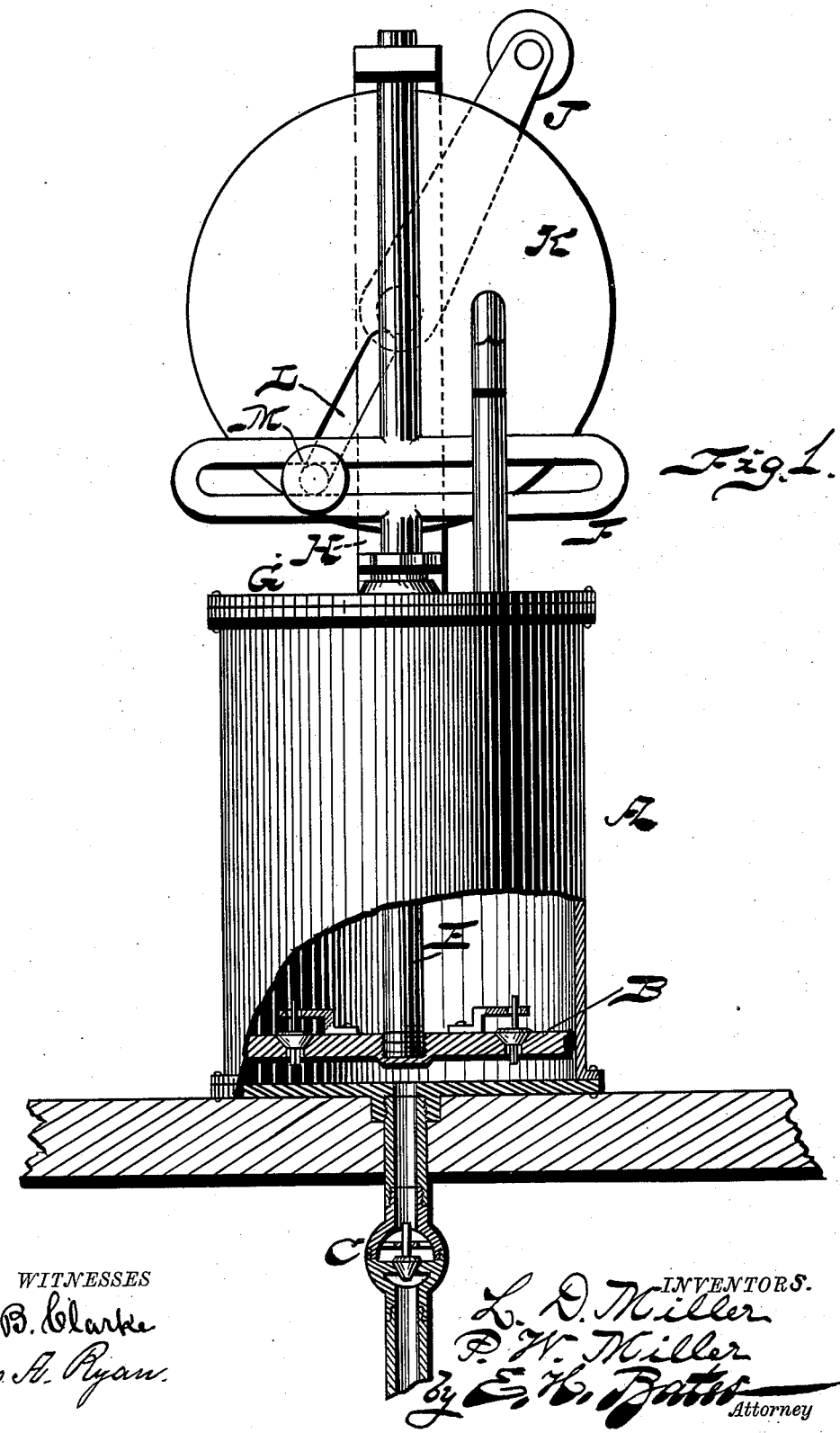

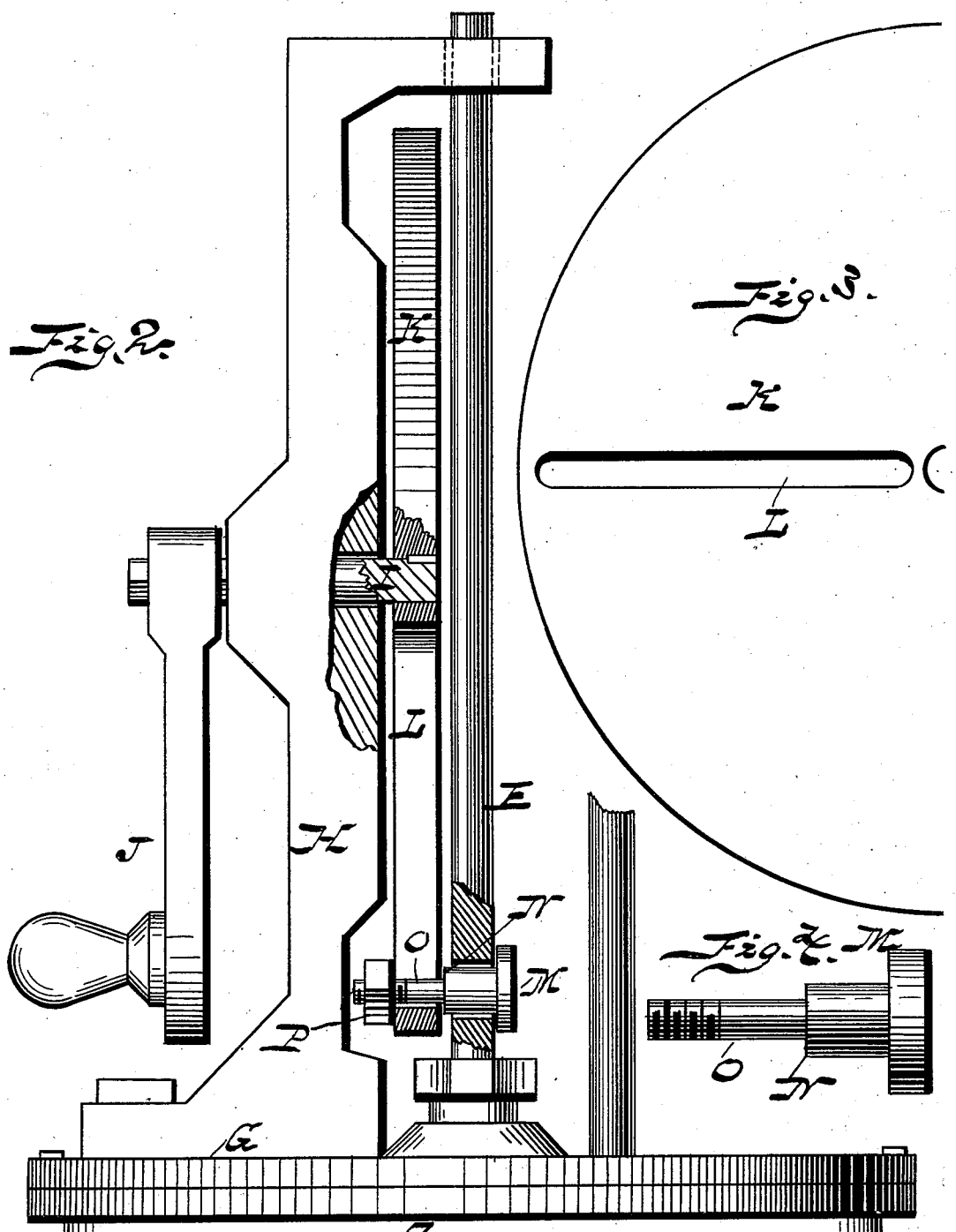

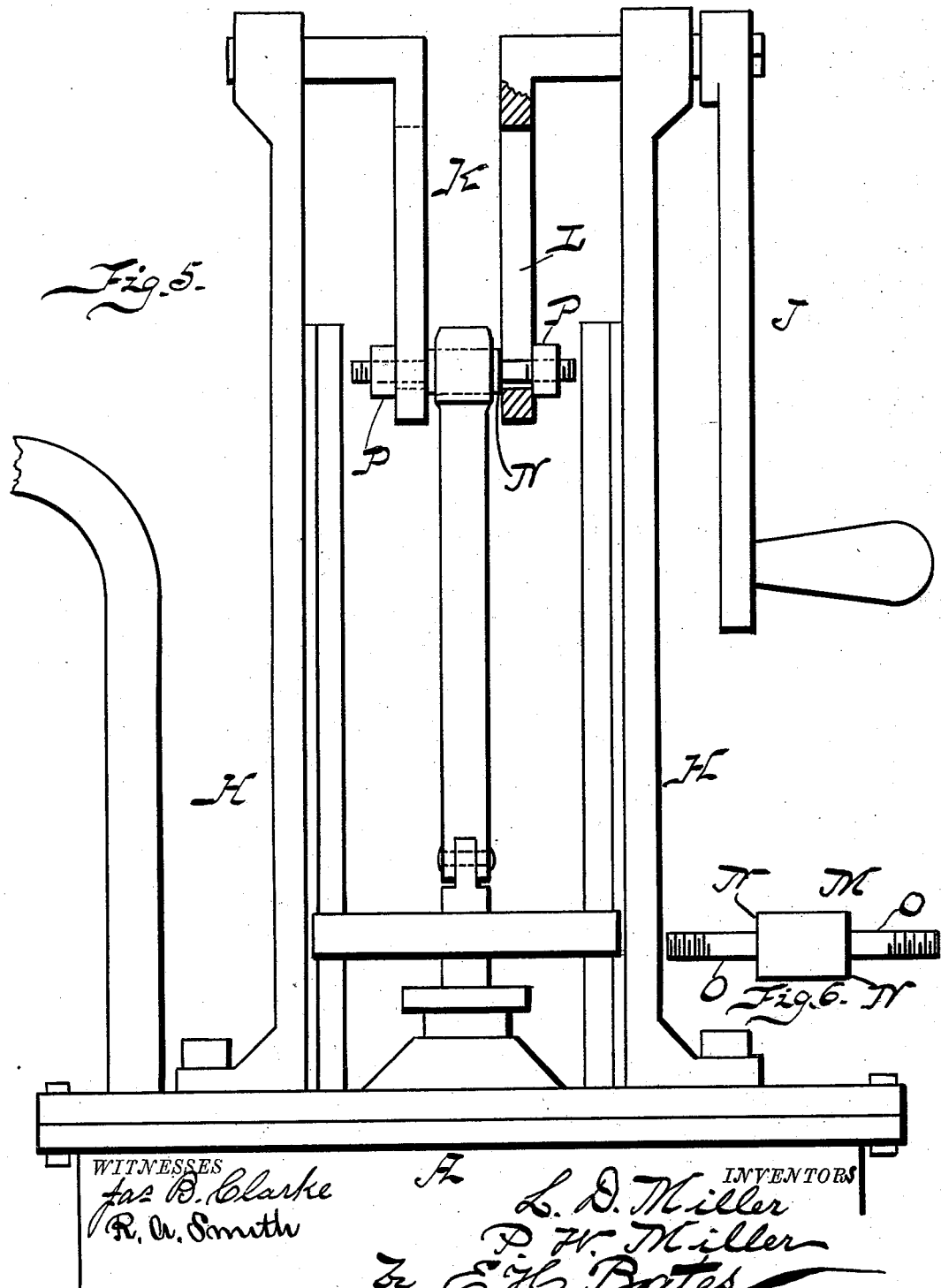

LEMUEL D. MILLER AND PHILIP W. MILLER, OF COLLAMER, PENNSYLVANIA.

MEASURING LIFT-PUMP.

SPECIFICATION forming part of Letters Patent No. 363,840, dated May 31, 1887.

Application filed February 16, 1887. Serial No. 227,821. (No model.)

*To all whom it may concern:*

Be it known that we, LEMUEL D. MILLER and PHILIP W. MILLER, citizens of the United States, residing at Collamer, in the county of Chester and State of Pennsylvania, have invented certain new and useful Improvements in Measuring Lift-Pumps; and we do hereby declare the following to be a full, clear, and exact description of the invention, such as will enable others skilled in the art to which it appertains to make and use the same.

This invention has relation to improvements in measuring lift-pumps; and it consists in providing means whereby the measuring of the liquid in the cylinder may be changed to different measurements, all as will be hereinafter fully described.

The annexed drawings, to which reference is made, fully illustrate our invention, in which—

Figure 1 represents a front view, part sectional, of our device. Fig. 2 is a side view, part sectional, of the same. Figs. 3 and 4 are detail views. Fig. 5 is a front view of our device modified, and Fig. 6 is a view of the bolt thereof.

Referring by letter to the accompanying drawings, A indicates the cylinder of the pump, which is designed to be constructed of any suitable size, and B is the plunger, which lifts the liquid from a vessel situated at any desired point, and C designates the check-valve, which prevents the liquid from running back to the vessel when once drawn up to the pump.

B represents the plunger, from which arises the piston-rod E, at the upper portion of which is a horizontal slotted arm, F, and arising from the cover G is a standard, H, having bearing for the upper end of the piston-rod, as shown in the drawings. Journaled to this standard is a shaft, I, having at one end a crank-handle, J, and to the opposite end is secured a disk or an arm, K, which is provided with a slot, L, designed to receive a bolt, M, having a shoulder, N, and a reduced screw-threaded portion, O, to receive a nut, P, whereby said disk or arm is loosely connected to the horizontal slot in the piston. This construction is designed to permit the operator to change the amount to be drawn in the cylinder from a given measurement to more or less, as desired, and which is accomplished in the following manner:

Should the cylinder be constructed to hold a certain amount, the revolution of the disk by means of the crank-handle would discharge that amount; but should a less quantity be desired the operator simply loosens the nut and moves the bolt toward the center of the disk, or, if a slotted arm, toward the horizontal shaft, thus enlarging the distance from the bottom of the cylinder to the plunger, and the same distance from the top of the cylinder to said plunger, thus reducing the quantity of liquid to be drawn; and at the same time, should a cylinder be constructed and the measure not being accurate, the slotted arm or disk can be so regulated as to remedy the same and cause the cylinder to give the exact measure for which it was designed. The cover is provided with an outlet-pipe which communicates with the interior, and the piston also has a packing, as shown.

The plunger is screwed to the lower end of the piston-rod, and the former is provided with on offset, whereby greater thickness is obtained and permitting the attachment of one another without the use of packing at this point. The plunger is further provided with check-valves, as shown, the stems of which pass through a perforation in an arm on either side of the rod, which is secured to the upper face of the plunger.

It will be seen that by our construction the amount of liquid can always be correctly gaged by simply changing the bolt from one position to another in the slotted disk or arm, and an accurate measurement can be readily obtained in the cylinder, and it is simple in operation, not liable to get out of order, and is cheap to manufacture.

Having described our invention, what we claim, and desire to secure by Letters Patent, is—

1. In a measuring device, the combination, with the piston-rod provided with the horizontal slot and plunger, and vessel A, having standard H, of the disk provided with the slot L, crank-handle J, and bolt M, provided with the shoulder N and reduced portion O, the whole adapted to operate for the purpose set forth.

2. In a measuring device, the combination, with the cylinder, piston carrying the plunger, standards, and slotted disk or arm, of the bolt having reduced portions and shouldered portion, as and for the purpose set forth.

In testimony whereof we affix our signatures in presence of two witnesses.

LEMUEL D. MILLER.
PHILIP W. MILLER.

Witnesses:
GEORGE WEBSTER,
WM. HELMICK.